(12) United States Patent
He et al.

(10) Patent No.: US 9,769,644 B2
(45) Date of Patent: Sep. 19, 2017

(54) SYSTEMS, METHODS, AND DEVICES FOR DEVICE-TO-DEVICE COMMUNICATION MODE SELECTION

(71) Applicant: INTEL IP CORPORATION, Santa Clara, CA (US)

(72) Inventors: Hong He, Beijing (CN); Yujian Zhang, Beijing (CN); Seunghee Han, Cupertino, CA (US)

(73) Assignee: INTEL IP CORPORATION, Santa Clara, CA (US)

(*) Notice: Subject to any disclaimer, the term of this patent is extended or adjusted under 35 U.S.C. 154(b) by 79 days.

(21) Appl. No.: 14/582,611

(22) Filed: Dec. 24, 2014

(65) Prior Publication Data

US 2015/0264677 A1    Sep. 17, 2015

Related U.S. Application Data

(60) Provisional application No. 61/953,645, filed on Mar. 14, 2014.

(51) Int. Cl.
| | |
|---|---|
| *H04W 8/00* | (2009.01) |
| *H04W 48/12* | (2009.01) |
| *H04W 72/02* | (2009.01) |
| *H04W 88/06* | (2009.01) |
| *H04W 28/06* | (2009.01) |

(Continued)

(52) U.S. Cl.
CPC ........... *H04W 8/005* (2013.01); *H04L 5/0028* (2013.01); *H04L 5/0032* (2013.01); *H04L 5/0069* (2013.01); *H04L 5/0091* (2013.01); *H04W 48/12* (2013.01); *H04W 72/02* (2013.01); *H04L 5/0023* (2013.01); *H04W 28/06* (2013.01); *H04W 72/04* (2013.01); *H04W 88/06* (2013.01)

(58) Field of Classification Search
CPC ...... H04W 8/005; H04W 48/12; H04W 72/02
USPC ........................................................ 370/312
See application file for complete search history.

(56) References Cited

U.S. PATENT DOCUMENTS

| | | | |
|---|---|---|---|
| 2002/0119757 A1* | 8/2002 | Hamabe | H04L 1/0003 455/69 |
| 2010/0240312 A1* | 9/2010 | Peng | H04W 72/02 455/63.1 |

(Continued)

OTHER PUBLICATIONS

PCT/US2015/015700, International Search Report and Written Opinion, May 19, 2015, 13 pages.

(Continued)

*Primary Examiner* — Ronald B Abelson
(74) *Attorney, Agent, or Firm* — Stoel Rives LLP

(57) ABSTRACT

A user equipment (UE) includes a transmission mode component, a selection component, and a transmission component. The transmission mode component is configured to selectively allocate resources for device-to-device communication according to a plurality of transmission modes. The plurality of transmission modes include a first transmission mode in which the resources used by the UE are specifically allocated by one of a base station or relay node and a second transmission mode in which the UE selects the resources from a pool of available resources. The selection component is configured to select a selected transmission mode. The transmission component is configured to transmit signals in frequency resources selected according to the selected transmission mode.

22 Claims, 6 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2010/0323753 | A1* | 12/2010 | Imamura | H04B 7/0689 455/552.1 |
| 2013/0102314 | A1* | 4/2013 | Koskela | H04W 36/0072 455/436 |
| 2013/0155894 | A1* | 6/2013 | Li | H04W 74/0833 370/252 |
| 2014/0057667 | A1 | 2/2014 | Blankenship et al. | |
| 2015/0215903 | A1* | 7/2015 | Zhao | H04W 72/04 370/329 |
| 2015/0223048 | A1* | 8/2015 | Al-Shalash | H04W 8/005 370/254 |

OTHER PUBLICATIONS

3GPP TR 36.843, "Study on LTE Device to Device Proximity Services; Radio Aspects", V1.2.0, Feb. 2014, 50 pages.
Ericsson, "On Procedures for In/Out of NW coverage detection for D2D", R1-140780, 3GPP TSG RAN WG1 Meeting #76, Prague, Czech Republic, Feb. 10-14, 2013, 5 pages.
Intel Corporation, "Resource allocation for D2D communication", R2-140312, 3GPP TSG RAN WG2 Meeting #85, Prague, Czech Republic, Feb. 10-14, 2014, 5 pages.
Interdigital Communications, "Consideration on Resource Allocation for D2D Discovery", R2-140760, 3GPP TSG-RAN WG2 #85, Prague, Czech Republic, Feb. 10-14, 2014, 5 pages.
PCT/US2015/015700, International Search Report and Written Opinion, May 19, 2015, 15 pages.

* cited by examiner

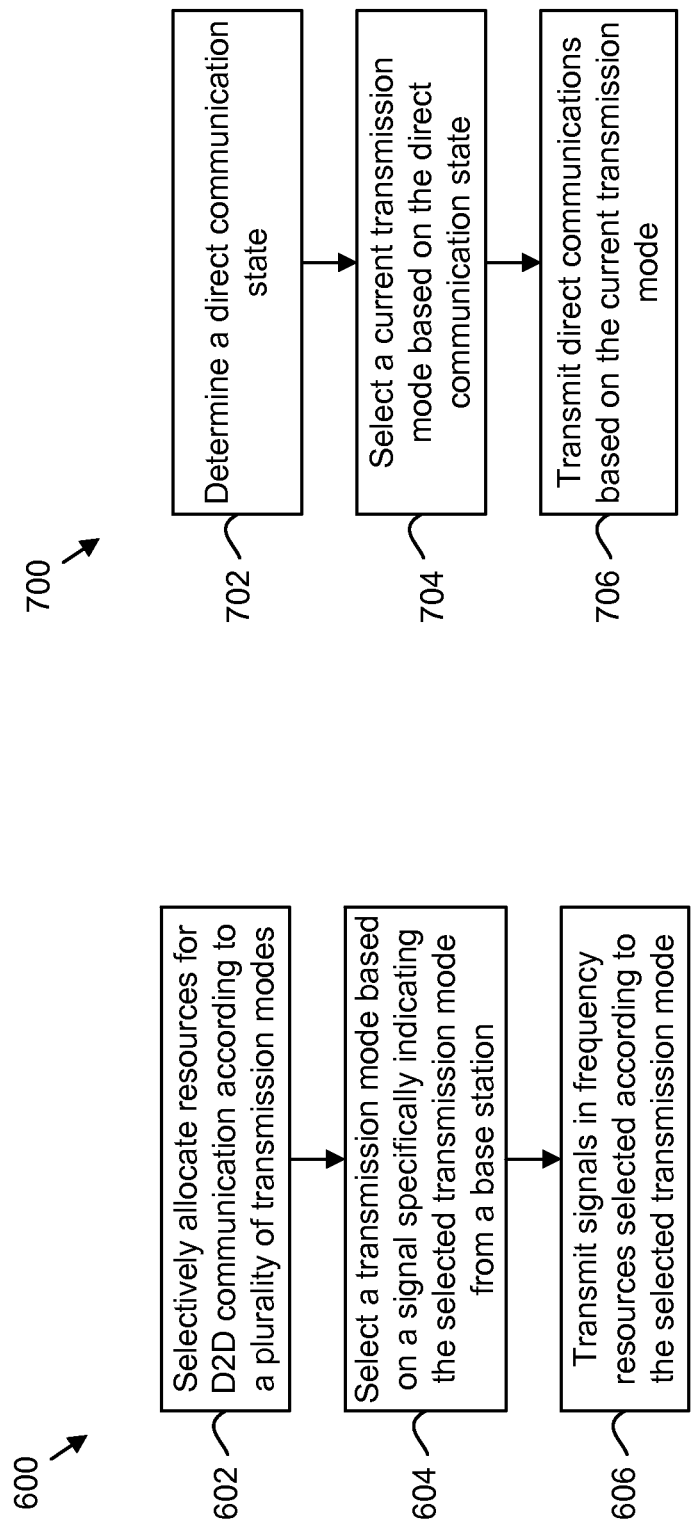

SYSTEMS, METHODS, AND DEVICES FOR DEVICE-TO-DEVICE COMMUNICATION MODE SELECTION

RELATED APPLICATION

This application claims the benefit under 35 U.S.C. §119(e) of U.S. Provisional Application No. 61/953,645, filed Mar. 14, 2014 with a docket number P64450Z, which is hereby incorporated by reference herein in its entirety.

TECHNICAL FIELD

The present disclosure relates to device-to-device communication mode selection.

BRIEF DESCRIPTION OF THE DRAWINGS

FIG. 6 is a schematic flow chart diagram illustrating a method for selecting a communication mode, according to one embodiment.

FIG. 7 is a schematic flow chart diagram illustrating another method for selecting a communication mode, according to one embodiment.

DETAILED DESCRIPTION OF PREFERRED EMBODIMENTS

Figure 1:
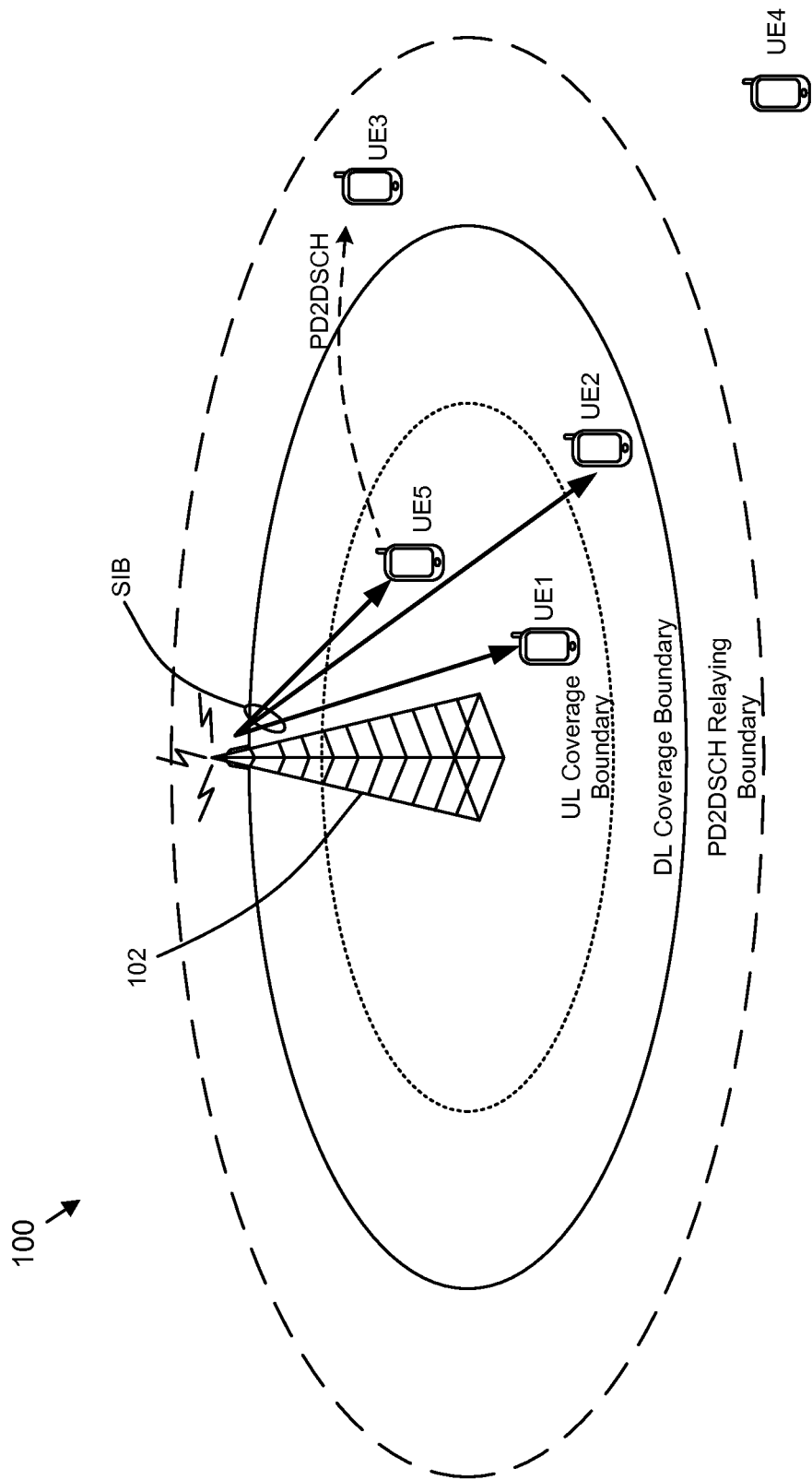
FIG. 1 is a schematic diagram illustrating example direct communication states of wireless communication devices.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a node (e.g., a transmission station or a transceiver node) and a wireless device (e.g., a mobile communication device). Some wireless devices communicate using orthogonal frequency division multiple access (OFDMA) in a downlink (DL) transmission and single carrier frequency division multiple access (SC-FDMA) in an uplink (UL) transmission. Standards and protocols that use orthogonal frequency division multiplexing (OFDM) for signal transmission include the 3rd Generation Partnership Project (3GPP) long term evolution (LTE) Rel. 8, 9 and 10; the Institute of Electrical and Electronics Engineers (IEEE) 802.16 standard (e.g., 802.16e, 802.16m), which is commonly known to industry groups as WiMAX (Worldwide interoperability for Microwave Access); and the IEEE 802.11-2012 standard, which is commonly known to industry groups as WiFi.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The DL transmission may be a communication from the node (e.g., eNB) to the wireless device (e.g., UE), and the UL transmission may be a communication from the wireless device to the node.

Proximity-based applications and proximity services (ProSe) represent an emerging social-technological trend. Proximity-based communication, which is also referred to herein as direct communication, device-to-device (D2D) communication, or peer-to-peer services or communication, is a powerful technique for increasing network throughput by enabling direct communications between mobile stations rather than routing data or control information over network infrastructure. D2D communications have a wide variety of applications. For example, D2D has been proposed for local social networks, content sharing, location-based marketing, service advertisements, public safety networks, mobile-to-mobile applications, and other services. D2D communications are of interest due to their ability to reduce load on a core network or a RAN, increase data rates due to direct and short communication paths, provide public safety communication paths, and provide other functionality. The introduction of a ProSe capability in LTE would allow the 3GPP industry to serve this developing market, and, at the same time, serve the urgent needs of several public safety services. This combined use may enable economy of scale advantages because the resulting system may be used for both public safety and non-public-safety services, where possible.

There are various alternatives to realize such a direct communication path between mobile devices. In one embodiment, the D2D air interface PC5 could be realized by some type of short-range technology, such as Bluetooth or Wi-Fi, or by reusing licensed LTE spectrum, such as a UL spectrum in a FDD LTE system or UL subframe(s) in a TDD LTE system. Furthermore, D2D communications can be generally divided into two parts. The first part is device discovery, whereby UEs are able to determine that they are within range and/or available for D2D communication. Proximity detection may be assisted by network infrastructure, may be performed at least partially by the UE, and/or may be performed largely independent of the network infrastructure. The second part is direct communication, or D2D data communication, between UEs, which includes a process to establish a D2D session between UEs as well as the actual communication of user or application data. D2D communication may or may not be under continuous control of a mobile network operator (MNO). For example, the UEs may not need to have an active connection with an eNB in order to take part in D2D communications. It should be noted that D2D communication (e.g., the second part) can be implemented and operated by D2D capable UEs independently without support of D2D discovery (e.g., the first part).

Currently, D2D direct discovery and communication are being studied and discussed in the service & systems aspects (SA) and RAN working groups (WGs) toward being specified as part of the LTE-A Release 12 specifications. During the RAN1 #76 meeting, the following was agreed with respect to resource allocation for D2D communication (broadcast at the physical layer):

From a transmitting UE perspective a UE can operate in two modes for resource allocation:
  Mode 1: eNodeB or rel-10 relay node schedules the exact resources used by a UE to transmit direct data and direct control information
    For future study (FFS): if semi-static resource pool restricting the available resources for data and/or control is needed
  Mode 2: a UE on its own selects resources from resource pools to transmit direct data and direct control information
    FFS if the resource pools for data and control are the same
    FFS: if semi-static and/or pre-configured resource pool restricting the available resources for data and/or control are needed
  D2D communication capable UE shall support at least Mode 1 for in-coverage
  D2D communication capable UE shall support Mode 2 for at least edge-of-coverage and/or out-of-coverage
  FFS: Definition of out-of-coverage, edge-of-coverage, in-coverage
    For example, definition of coverage areas is at least based on DL received power Furthermore, the following was agreed as a working assumption by the RAN1 WG during RAN1 #76 meeting on transmission of scheduling assignments for D2D broadcast communication:

For Mode 2
  A resource pool for scheduling assignment is pre-configured and/or semi-statically allocated
    FFS whether the resource pool for scheduling assignment is same as the resource pool for D2D data
  UE on its own selects the resource for scheduling assignment from the resource pool for scheduling assignment to transmit its scheduling assignment
For Mode 1
  the location of the resources for transmission of the scheduling assignment by the broadcasting UE comes from the eNodeB
  the location of the resource(s) for transmission of the D2D data by the broadcasting UE comes from the eNodeB So far, the exact criterion to determine a UE as an edge-of-coverage UE and related UE behavior with respect to D2D communication were not discussed and are still open questions in 3GPP LTE. In the present disclosure, we propose several potential methods to select one of two communication modes (Mode-1 and Mode-2) based on either eNB configuration or UE-autonomous measurement. In this disclosure, several transmission mode selection mechanisms are proposed to address the open issues including how D2D capable UE selects the D2D communication Mode between Mode-1 and Mode-2 considering several factors such as radio resource control (RRC) or radio channel condition assessed by UE.

FIG. 1 is a schematic diagram illustrating possible UE states when D2D communication is triggering. The UE D2D state may provide information about a radio channel environment or condition that may affect how D2D transmission resources are allocated. Specifically, UE1 has both UL and DL coverage. A D2D state of UE1 may be referred to herein as State-1 or as fully in-coverage. In this state, the network can configure UE1 to perform D2D communication with either Mode-1 or Mode-2. UE2 has DL coverage but no uplink linkage because it is within the DL coverage boundary but outside the UL coverage boundary. Thus, UE2 may only be able to use Mode-2 communication. A D2D state of UE2 may be referred to herein as State-2 or as in UL-only coverage. UE3 and UE4 are outside of UL and DL coverage of the eNB 102 and thus cannot detect any D2D-specific SIB information. Thus, only Mode-2 communication may be possible due to lack of RRC connection with eNB 102. UE3 is shown outside of UL and DL coverage, but within a physical D2D shared channel signal (PD2DSCH) relaying boundary. A D2D state of UE3 may be referred to herein as State-3 or as within partial network coverage. UE4 is outside of UL coverage, DL coverage, and the PD2DSCH relaying boundary. A D2D state of UE4 may be referred to herein as State-4 or as out-of-network coverage.

In a first optional embodiment, D2D transmission mode selection is controlled by the eNB 102. With this option, the eNB 102 decides the D2D transmission mode for D2D capable UE and explicitly configures it for the UE through dedicated RRC messages (e.g., RRCConnectionReconfiguration) in response to acquiring D2D capability information. In one embodiment, D2D transmission Mode-1 could be specified as the default mode used for D2D communication if no explicit eNB configuration is detected. Additionally, a first network connection condition and a second network connection condition, discussed below, can be used by a UE to enable D2D communication mode autonomously and thereby move from Mode-1 to Mode-2 in situations when the UE loses the UL connection with the eNB 102. For example, when the UE is within full network coverage of the eNB 102 the UE may select either Mode-1 or Mode-2 based on explicit signaling from the eNB 101.

In a second optional embodiment, the D2D transmission mode selection is controlled by the UE. For example, a UE may independently determine which transmission mode to use without the transmission mode being explicitly configured by the eNB 102. Several network connection conditions/criteria may be specified for UL connection loss detection in order to give a controlled way for the D2D UE to autonomously go to Mode-2 in case the UL connection with serving cell eNB 102 is lost and back to Mode-1 in case RRC connection can be re-established.

The metrics used for the device to determine whether it loses UL connection with serving eNB 102 could be defined by the first network connection condition and the second network condition described below. For example, the UE may assume it has lost UL coverage/connection if one or more of the first network connection condition and the second network connection condition are met and then to use Mode-2 for D2D communication transmission. If the first network connection condition and the second network connection condition are not met, the UE may autonomously decide to use Mode-1.

The first network connection condition may determine that a signal from the eNB 102 has fallen below a threshold signal strength or signal quality. For example, the UE may measure a DL received power level or quality of a Common Reference Signal (CRS), Primary Synchronization Signal (PSS), and/or Secondary Synchronization Signal (SSS) of a serving cell, such as the eNB 102. For example, CRS-based reference signal received power (RSRP) or reference signal receive quality (RSRQ) may be used. If the measured power level or quality is below or equal to a predefined threshold, the UE may decide that the first network connection condition is satisfied. In one embodiment, parameters for measuring the signals may be standardized within the 3GPP standard or configured by the eNB 102 such that consistent measurement is achieved. Example predefined parameters may include filter taps, a sampling interval, or the like.

The second network connection condition may determine that a UL connection with an eNB 102 has been lost. For example, the second network condition may be satisfied when a number of consecutively failed random access attempts (i.e., no random access response (RAR) received) is equal to or larger than a predefined threshold. As another example, the second network condition may be satisfied when a number of scheduling requests without UL grant is equal to or larger than a predefined threshold. In one embodiment, upon receiving an RAR response after a random access transmission for D2D resource request, or upon receiving UL grant for D2D-buffer status report (BSR) reporting, the UE may determine that the second network connection is not (or is no longer) satisfied. For example, if the second network condition (and/or the first network condition) is not satisfied, the UE may consider that it has a UL connection with the eNB 102 and use Mode-1 for D2D transmission.

In one embodiment, threshold values for one or more of the first network connection condition and the second network connection condition may be configured via a broadcasted system information block message (e.g., SIB) from the controlling node (e.g., eNB 102) or configured through UE-specific dedicated RRC signaling. Similarly, the threshold values or parameters may be predefined within a 3GPP standard.

Figure 2:
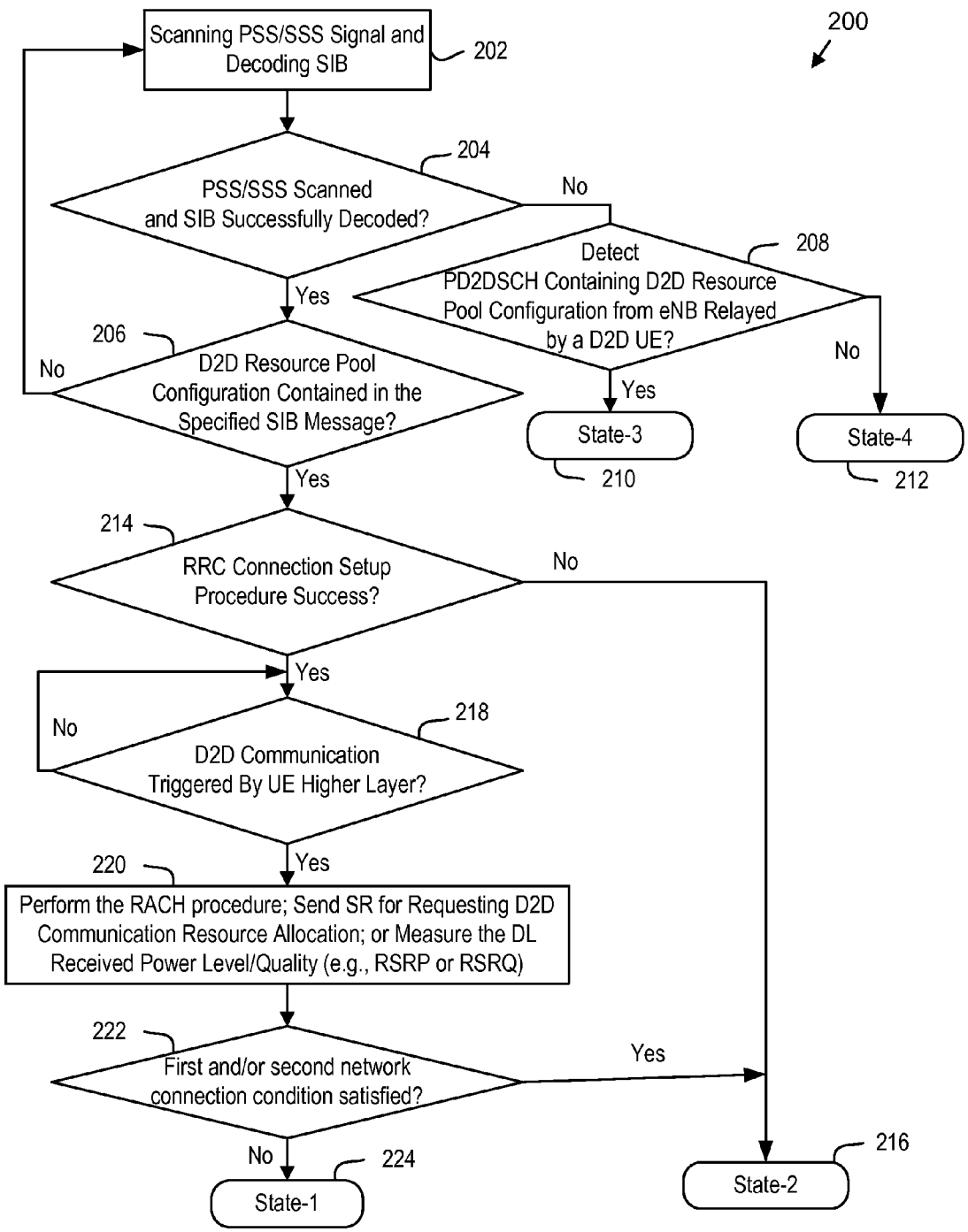
FIG. 2 is a schematic flow chart diagram illustrating a method for determining a current direct communication state, according to one embodiment.

In one embodiment, a UE may enter one of the four D2D states, discussed above, in response to powering on. For example, the UE may make DL measurements to determine a D2D state of the UE and determine a current mode based on the determined D2D state. FIG. 2 is a flow chart diagram illustrating one embodiment of a method 200 for selecting a D2D state. For example, the UE may perform the method 200 upon powering on and/or may repeatedly perform the method 200 to determine new states. The method 200 begins and the UE scans 202 for a DL synchronization signal (e.g., PSS/SSS) to obtain downlink synchronization with an eNB 102 and then camps on the cell. The UE determines 204 whether the PSS/SSS is scanned and whether the SIB is successfully decoded. If the UE determines 204 that the PSS/SSS was not successfully scanned or that the SIB was not successfully decoded (No at 204), the UE further determines 208 whether it is able to detect a PD2DSCH containing D2D resource pool configuration from the eNB 102 that has been relayed by a D2D UE (such as UE5 of FIG. 1). If Yes, the UE determines that it is in State-3 (see UE3 of FIG. 1). If No at 206, the UE determines that the UE is in State-4 (see UE4 of FIG. 1).

If the UE determines 204 that the PSS/SSS was successfully scanned and that the SIB was successfully decoded (Yes at 204), the UE further determines 206 whether the SIB contains configuration information for a D2D resource pool and/or if the eNB 102 supports D2D function. If No at 206, the UE returns to scanning 202 for PSS/SSS signals and decoding SIB. If Yes at 206, the UE attempts to perform an RRC connection setup procedure to establish the RRC connection with the detected eNB 102. If the RRC connection setup procedure is not a success (No at 214), the UE determines that the UE is in State-2. If the RRC connection setup procedure is a success (Yes at 214), the UE determines 218 whether D2D communication is triggered by a higher layer of the UE. For example, the UE may determine whether an application layer, RRC layer, or other layer indicates that a D2D transmission should be performed. If No at 218, the UE may continue to wait until D2D communication is triggered by the higher layers. If/when D2D communication is triggered by a higher layer (Yes at 218), the UE does one or more of the following at 220: perform a random access channel (RACH), send a scheduling request (SR) for requesting D2D communication resource allocation, and/or measure the DL received power/quality (e.g., measure RSRP or RSRQ). The UE determines 222 whether the first network connection and/or the second network condition are satisfied. In one embodiment, if the first and second network conditions are satisfied (Yes at 222), the UE determines that the UE is in State-2 (see UE2 in FIG. 1). If the first or second network conditions are not satisfied (No at 222), the UE determines that the UE is in State-1 (see UE1 of FIG. 1).

Table 1 below illustrates UE actions and D2D communication mode selection in each D2D state.

TABLE 1

D2D UE Behavior and D2D Communication Mode Determination

| D2D State | UE Behavior | D2D Comm. Mode | D2D Transmission Resources |
|---|---|---|---|
| State-1 | Perform conventional Radio Link Monitoring (RLM) to determine whether to transfer to another state (e.g., State-3 or State-4) and to periodically/regularly verify whether RRC connection is still valid. Radio link measurement to regularly/periodically check whether the defined first and/or second network connection conditions are met to determine whether to transfer to State-2. If either metric is met, then go to State-2, otherwise stay in State-1. | Mode-1 | granted by eNB |
| State-2 | Perform conventional RLM to determine whether to transfer to another state (e.g., State-3 or State-4) and to periodically/regularly verify whether RRC connection is still valid. | Mode-2 | UE autonomously selects from resource pool broadcasted by SIB message(s) |

TABLE 1-continued

D2D UE Behavior and D2D Communication Mode Determination

| D2D State | UE Behavior | D2D Comm. Mode | D2D Transmission Resources |
|---|---|---|---|
| | Radio link measurement to regularly/periodically check whether the defined first and/or second network connection conditions are met to determine whether to transfer to State-1. If neither the first nor the second network connection conditions is met, then go to State-1, otherwise stay in State-2. | | |
| State-3 | Scan for synchronization signals PSS and/or SSS from eNB to determine whether to switch to State-2. Monitor and try to decode broadcasted information (i.e., SIB message). If SIB is decoded, move to State-2. | Mode-2 | UE autonomously selects from resource pool relayed by a D2D UE via PD2DSCH message. The resource pool and PD2DSCH is initiated by an eNB. |
| State-4 | Scan for synchronization signals PD2DSS from relayed UE and PD2DSCH to determine when to switch to State-3. | | UE autonomously selects from a pre-configured resource pool (e.g., previously defined/communicated by an eNB and/or a 3GPP standard) |

Figure 3:
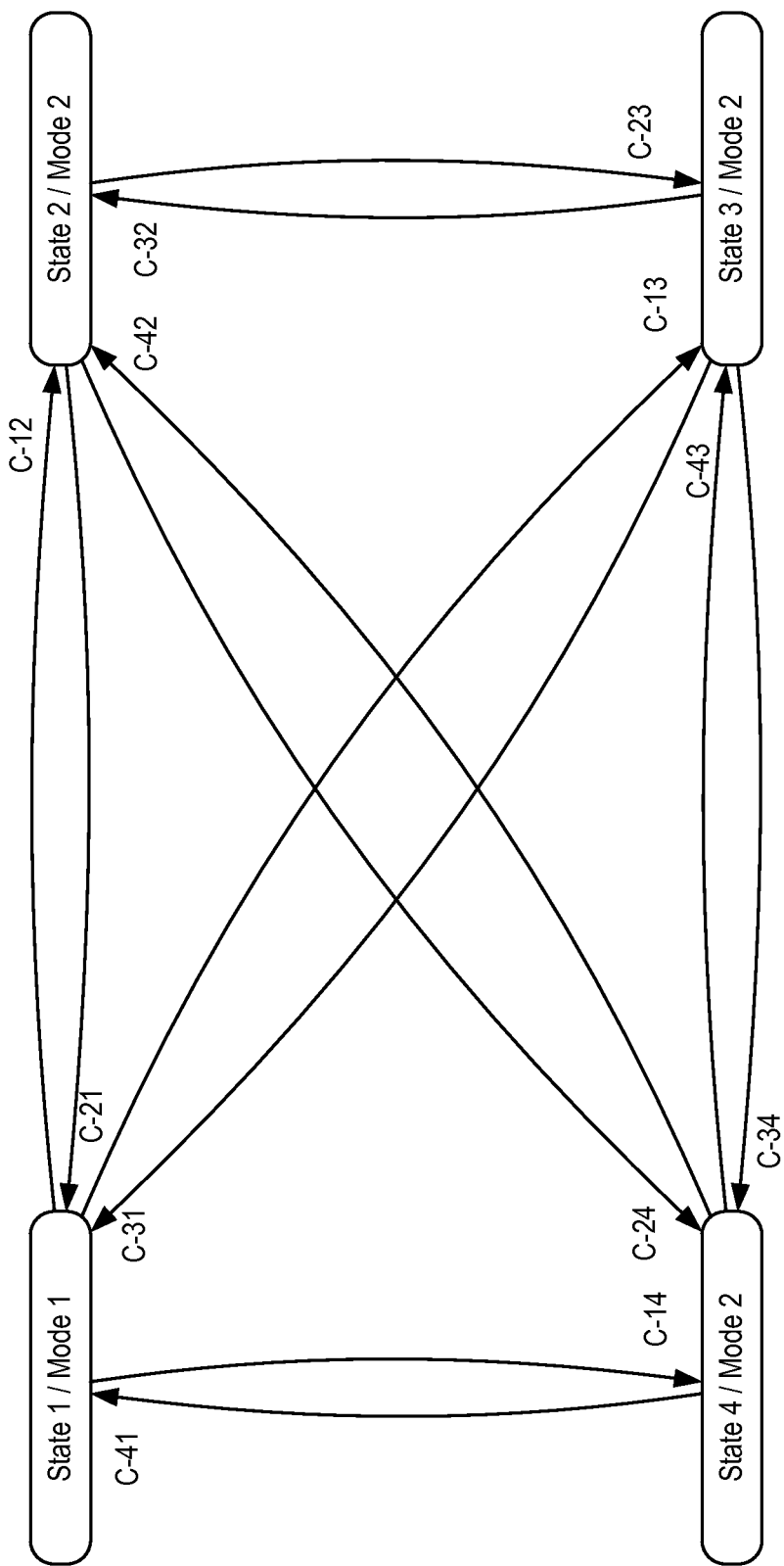
FIG. 3 is a schematic diagram illustrating example transitions between direct communication states, according to one embodiment.

In one embodiment, different actions/behaviors are performed in each state in order to achieve D2D communication design targets and enable an autonomous D2D state transition. FIG. 3 illustrates example transitions between communication states. Table 2 below provides example measurements and procedures performed by a UE in each state to determine whether to transition to a new state.

TABLE 2

D2D Communication States Transition Conditions

| Transition Name | State Transferring | Transition Condition Definition |
|---|---|---|
| C-21 | State-2 to State-1 | RRC connection setup procedure is successful. |
| C-31 | State-3 to State-1 | PSS/SSS is detected (i.e., UE reliably detected an eNB). UE |
| C-41 | State-4 to State-1 | continuously takes attempts for PSS/SSS scanning on a regular basis in State-3 and State-4. |
| | | SIB message containing D2D resource pool configuration is decoded successfully. |
| | | RRC connection setup procedure is successful. |
| | | Neither of the first or second network connection conditions is satisfied. |
| C-12 | State-1 to State-2 | At least one of the first and second network connection conditions is satisfied. |
| C-32 | State-3 to State-2 | PSS/SSS is detected (i.e., UE reliably detected an eNB). UE continuously scans for PSS/SSS on a regular basis in State-3. |
| | | SIB message containing D2D resource pool configuration is decoded successfully. |
| | | RRC connection setup procedure failed. |
| | | At least one of the first and second network connection conditions is satisfied. |
| C-42 | State-4 to State-2 | PSS/SSS is detected (i.e., UE reliably detected an eNB). UE continuously scans for PSS/SSS on a regular basis in State-3. |
| | | SIB message containing D2D resource pool configuration is decoded successfully. |
| | | RRC connection setup procedure failed. |
| | | At least one of the first and second network connection conditions is satisfied. |
| C-13 | State-1 to State-3 | RLM indicates out of sync on lower layer and UE failed to |
| C-23 | State-2 to State-3 | recover the radio link sync with eNB within a defined time period (e.g., T310 timer). The UE enters RRC_Idle mode. |
| | | PD2DSS channel is detected and successfully decode the D2D resource pool configuration transmitted on PD2DSCH. |

TABLE 2-continued

D2D Communication States Transition Conditions

| Transition Name | State Transferring | Transition Condition Definition |
|---|---|---|
| C-43 | State-4 to State-3 | PD2DSS channel is detected and successfully decodes the D2D resource pool configuration transmitted on PD2DSCH. |
| C-14 | State-1 to State-4 | RLM indicates out of sync on lower layer and UE failed to recover the radio link sync with eNB within a defined time period (e.g., T310 timer). The UE enters RRC_Idle mode. No D2D resource pool configuration decoded/detected on PD2DSCH. |
| C-24 | State-2 to State-4 | |
| C-34 | State-3 to State-4 | No PSS/SSS is detected. No D2D resource pool configuration decoded/detected on PD2DSCH. |

In a third optional embodiment, the D2D transmission mode selection is controlled by the UE based on an RRC state. For example, when D2D communication is initiated, the UE may autonomously select a transmission mode for D2D communication based on the RRC state, which may be either RRC_Idle or RRC_Connected. Specially, a UE in RRC_Connected may perform D2D communication by using transmission Mode-1 while UEs in RRC_Idle may use transmission Mode-2.

The first optional embodiment, second optional embodiment, and third optional embodiment are given for illustrative purposes only. While the first optional embodiment, second optional embodiment, and third optional embodiment are discussed separately above, some embodiments include combinations of one or more aspects of each of the optional embodiments. For example, a UE may operate according to the second optional embodiment, when no eNB 102 is detected but operate according to the first optional embodiment or second optional embodiment when the UE has a connection with the eNB 102.

Figure 4:
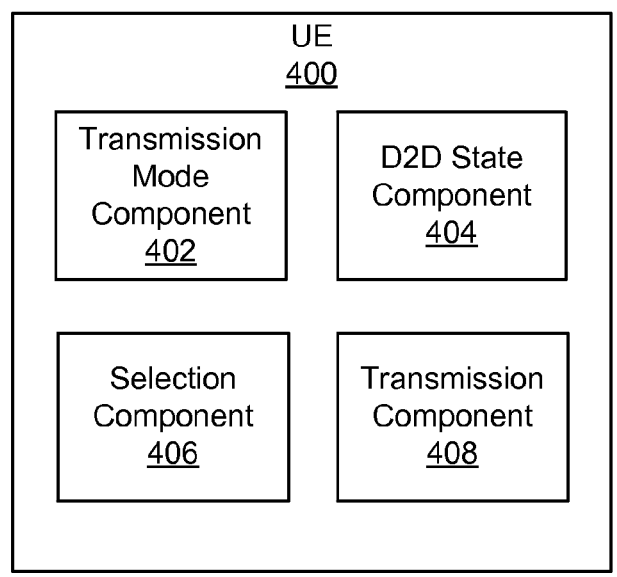
FIG. 4 is a schematic block diagram illustrating components of a user equipment (UE), according to one embodiment.

FIG. 4 is a schematic block diagram of a UE 400 illustrating some components for selecting a D2D communication mode. Some components of the UE 400 are not shown to avoid obscuring the disclosure. The UE 400 includes a transmission mode component 402, a D2D state component 404, a selection component 406, and a transmission component 408. The components 402-408 are given by way of example only and may not all be included in all embodiments.

The transmission mode component 402 selectively allocates resources for D2D communication according to a plurality of transmission modes. The plurality of transmission modes include a first transmission mode in which the resources used by the UE 400 are specifically allocated by one of a node B and an eNB 102 and a second transmission mode in which the UE 400 selects the resources from a pool of available resources. In one embodiment, the first transmission mode may include Mode-1 discussed herein and the second transmission mode may include Mode-2 discussed herein.

The D2D state component 404 determines a direct communication state (e.g., a D2D state) of the UE 400 in relation to an eNB 102. In one embodiment, the D2D state component 404 determines whether the UE 400 is outside of network coverage. For example, the D2D state component 404 may determine whether one or more of the first and second network connection conditions are satisfied. In one embodiment, the D2D state component 404 determines that the UE 400 is outside of network coverage based on one or more of: a measured power level or signal quality of a reference signal from the node B or the eNB 102 being less than or equal to a predefined cell threshold; and a number of failed random access attempts without receiving a UL grant is greater than or equal to a predefined attempts threshold.

In one embodiment, the D2D state component 404 determines whether the UE 400 is in a connected RRC state or is not in the connected RRC state. For example, the D2D state component 404 may determine whether the UE 400 is in an RRC_Connected state or an RRC_Idle state.

In one embodiment, the D2D state component 404 determines whether the UE 400 is in one or more of the four D2D states discussed in relation to FIGS. 1 and 2. In one embodiment, the D2D state component 404 is configured to determine whether the UE 400 is in a first D2D state (such as State-1), a second D2D state (such as State-2), a third D2D state (such as State-3), or a fourth D2D state (such as State-4). In one embodiment, the UE 400 is in the first D2D state when the UE 400 is within UL coverage and within DL coverage of the eNB. In one embodiment, the UE 400 is in the second D2D state when the UE 400 is outside UL coverage and within DL coverage of the eNB. In one embodiment, the UE 400 is in the third D2D state when the UE 400 is within partial network coverage. For example, the UE 400 may be in partial network coverage when the UE 400 is outside UL coverage and outside DL coverage, but within D2D range of another UE that is in the first D2D state (e.g., see FIG. 1 in which UE3 is in partial network coverage because it can receive PD2DSCH from UE5). For example, the D2D state component 404 may determine a current D2D state based on whether or not a PD2DSCH is detected. In one embodiment, the UE 400 is in the fourth D2D state when the UE 400 is outside network coverage and outside partial network coverage.

In one embodiment, the D2D state component 404 is configured to determine/detect transitions between the D2D states based on one or more transition rules, such as the transition rules in Table 2 and illustrated by FIG. 3. In one embodiment, the D2D state component 404 is configured to determine an initial D2D state and then determine one or more subsequent D2D states.

The selection component 406 is configured to select a transmission mode for the UE 400 to use during D2D communications, such as one of communication Mode-1 or Mode-2 discussed herein. In one embodiment, the selection component 406 selects based on a signal from an eNB 102 that specifically indicates the selected transmission mode. For example, the eNB 102 may send, and the selection component 406 may receive, an RRC message comprising information indicating the selected transmission mode. In one embodiment, the selection component 406 may receive the RRC message in response to the UE 400 sending capability information indicating D2D capabilities of the UE 400. In one embodiment, when no signal from the eNB 102 specifically indicating the selected transmission mode can be detected, the selection component 406 may select a default mode comprising one of a plurality of available transmission modes in the absence of the signal specifically indicating the selected transmission mode. For example, the selection component 406 may default to using either Mode-1 or Mode-2 if the selection component 406 has not received signaling explicitly configuring the communication mode.

In one embodiment, the selection component 406 is configured to select a transmission mode based on an RRC connection state of the UE 400 with an eNB 102 or other node. For example, the selection component 406 may select the transmission mode based on the D2D state determined by the D2D state component 404. For example, the selection component 406 may select a first transmission mode (e.g., Mode-1) when the UE 400 is in an RRC_Connected state and select the second transmission mode (e.g., Mode-2) when the UE 400 is in an RRC_Idle state.

In one embodiment, the selection component 406 is configured to autonomously select one of the plurality of transmission modes in response to the current D2D state, such as State-1, State-2, State-3, and State-4 discussed herein. In one embodiment, the selection component 406 selects the mode based on the state determined by the D2D state component 404. For example, the selection component 406 may select the current mode based on Table 1 and/or FIG. 2. In one embodiment, the selection component 406 is configured to select the first transmission mode for the first D2D state and select the second transmission mode for the second D2D state, third D2D state, and fourth D2D state. The selection component 406 may also monitor current conditions to determine transitions between the D2D states based on one or more transition rules. For example, the selection component 406 may determine when a transition to a new state is needed based on FIG. 3 and/or Table 2.

The transmission component 408 is configured to transmit signals in frequency resources selected according to the selected transmission mode. For example, the transmission component 408 may transmit signals within resources specifically allocated by an eNB 102 or may transmit signals within resources selected by the UE 400 from a resource pool. The resource pool may be a preconfigured or may be defined by the eNB 102 or other network infrastructure.

Figure 5:
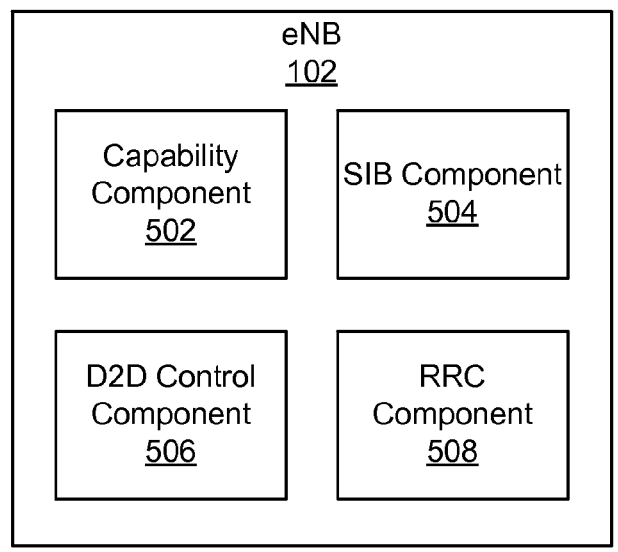
FIG. 5 is a schematic block diagram illustrating components of a base station, according to one embodiment.

FIG. 5 is a schematic block diagram of an eNB 102 illustrating some components for specifying a D2D communication mode. Some components of the eNB 102 are not shown to avoid obscuring the disclosure. The eNB 102 includes a capability component 502, an SIB component 504, a D2D control component 506, and an RRC component 508. The components 502-508 are given by way of example only and may not all be included in all embodiments.

The capability component 502 is configured to receive capability information from a UE 400 indicating that the UE 400 is capable of D2D communication using a 3GPP communication standard. In one embodiment, the capability component 502 may receive the capability information after a communication session (such as an RRC session) has been established with the UE 400.

The SIB component 504 is configured to broadcast a SIB indicating a D2D resource pool for resources available for D2D communication or discovery. For example, the resource pool may include one or more D2D discovery zones, D2D communication zones, or the like that a UE 400 may use to transmit D2D control or data signals. In one embodiment, the SIB information may be received by all UEs 400 that are within a DL coverage area (such as UE1 and UE2 in FIG. 1). In one embodiment, even a UE 400 outside a DL coverage area but within a PD2DSCH relay boundary may receive the SIB information because in-coverage UEs may forward on the resource pool configuration (e.g., UE3 receives PD2DSCH including resource pool configuration in FIG. 1).

The D2D control component 506 is configured to determine a transmission mode for a UE 400, such as communication Mode-1 or Mode-2 discussed herein. The D2D control component 506 may select a mode for a UE 400 based on a current network load, a signal strength from the UE 400, or other performance parameters of the eNB 102 or network. In one embodiment, the D2D control component 506 may determine that UE 400 which is connected to the eNB 102 should use Mode-2 to reduce signaling requirements on the eNB 102.

The RRC component 508 is configured to indicate a transmission mode to the UE 400 using RRC signaling. For example, the RRC component 508 may provide a message to a UE 400 indicating the specific transmission mode (e.g., Mode-1 or Mode-2 discussed herein) selected by the D2D control component 506 to be used by the specific UE 400. In one embodiment, the RRC component 508 is configured to indicate the transmission mode in response to receiving the capability component 502 receiving capability information from the UE 400. In one embodiment, the RRC component 508 may further send an RRC message granting the UE 400 access to an UL channel for D2D communication or discovery. For example, the RRC component 508 may grant access in response to the UE 400 requesting access to the channel for transmitting D2D discovery, data, or control signals.

FIG. 6 is a schematic flow chart diagram illustrating an example method 600 for selecting a communication mode for D2D communication. The method 600 may be performed by a wireless communication device, such as the UE 400 of FIG. 4.

The method 600 begins and a transmission mode component 402 selectively allocates 602 resources for D2D communication according to a plurality of transmission modes. For example, the transmission mode component 402 may either select a first transmission mode in which the resources used by the UE 400 are specifically allocated by one of a node B and eNB 102 (such as Mode-1) or select a second transmission mode in which the UE 400 selects the resources from a pool of available resources (such as Mode-2).

A selection component 406 is configured to select 604 a transmission mode based on a signal specifically indicating the selected transmission mode. For example, the selection component 406 may select 604 the transmission mode based on an RRC message received from an eNB 102. A transmission component 408 transmits 606 signals in frequency resources selected according to the selected transmission mode. For example, if the selection component 406 selected Mode-1, the transmission component 408 may transmit D2D data or control information in the exact resources allocated by the eNB 102.

FIG. 7 is a schematic flow chart diagram illustrating an example method 700 for selecting a communication mode for D2D communication. The method 700 may be performed by a wireless communication device, such as the UE 400 of FIG. 4.

The method 700 begins and the D2D state component 404 determines 702 a direct communication state. For example, the D2D state component 404 may identify a radio environment with respect to an eNB 102. In one embodiment, the D2D state may include an RRC connection state, whether DL or UL signals from a base station, or other information about a location or radio environment of a UE 102. In one embodiment, the D2D communication state may indicate whether the UE 400 can communicate with a node of a communication network or the like. For example, the D2D state component 404 may determine 702 whether a UE 400 is in an RRC connected or not in an RRC connected state. As another example, the D2D state component 404 may determine 702 whether the UE 400 is in any of State-1, State-2, State-3, or State-4, as discussed herein. For example, the D2D state component 404 may determine 702 the current state based on the method of FIG. 2.

The selection component 406 selects 704 a current transmission mode based on the direct communication state, for example, the direct communication state determined 702 by the D2D state component 404. In one embodiment, the current transmission mode may include a first transmission mode in which the resources used by the wireless communication device are specifically allocated by the base station or a second transmission mode in which the wireless communication device selects the resources from a pool of available resources. For example, the current transmission mode may include any of the modes discussed herein.

The transmission component 408 transmits 706 direct communications based on the current transmission mode. For example, the transmission component 408 may transmit 706 a D2D data or control signal based on the mode selected 704 by the selection component 406.

Figure 8:
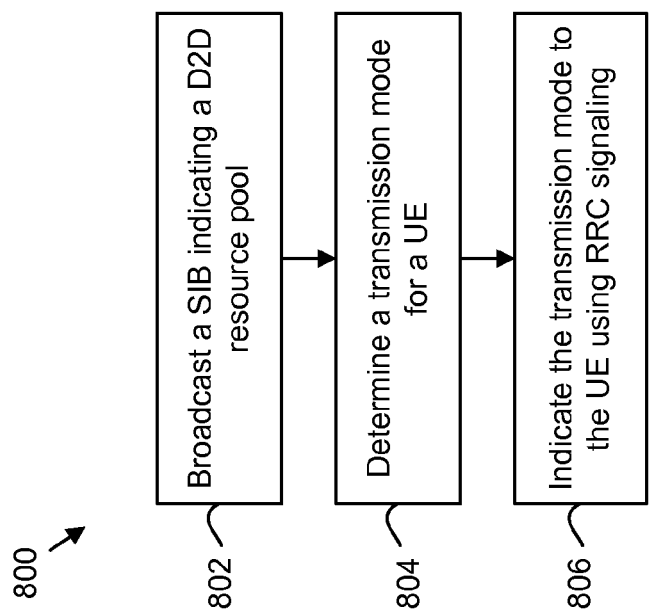
FIG. 8 is a schematic flow chart diagram illustrating a method for configuring a communication mode, according to one embodiment.

FIG. 8 is a schematic flow chart diagram illustrating an example method 800 for configuring a communication mode for D2D communication. The method 800 may be performed by a base station, such as the eNB 102 of FIG. 5.

The method 800 begins and an SIB component 504 broadcasts 802 a SIB indicating a D2D resource pool for resources available for D2D communication or discovery. For example, the SIB component 504 may transmit one or more SIBs for receipt by any UEs 400 that are in-range of the eNB 102. Thus, all UEs 400 in range of the eNB 102 may receive a D2D resource pool configuration and know which resources may be available for D2D data or control communications.

A D2D control component 506 determines 804 a transmission mode for a UE 400. For example, the D2D control component 506 may determine 804 a specific transmission mode for the specific UE 400. In one embodiment, the D2D control component 506 may determine 804 the transmission mode based on a load on the eNB 102, a D2D state of the UE 400, or any other information. The RRC component 508 indicates 806 the transmission mode to the UE 400 using RRC signaling. For example, the RRC component 508 indicates 806 the transmission mode determined 804 by the D2D control component 506.

Figure 9:
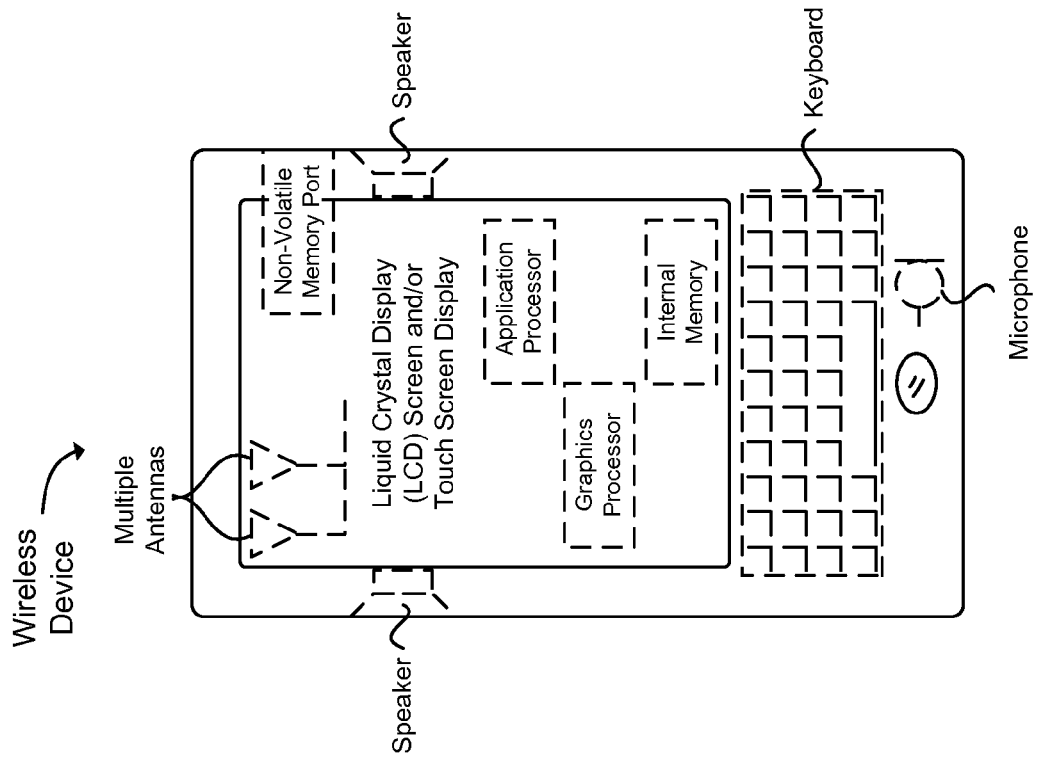
FIG. 9 illustrates a diagram of a wireless device (e.g., UE) in accordance with an example.

FIG. 9 provides an example illustration of a mobile device, such as a UE, a mobile station (MS), a mobile wireless device, a mobile communication device, a tablet, a handset, or another type of mobile wireless device. The mobile device may include one or more antennas configured to communicate with a node, macro node, low power node (LPN), or transmission station, such as a base station (BS), an eNB, a base band unit (BBU), a remote radio head (RRH), a remote radio equipment (RRE), a relay station (RS), a radio equipment (RE), or another type of wireless wide area network (WWAN) AP. The mobile device may be configured to communicate using at least one wireless communication standard, including 3GPP LTE, WiMAX, High Speed Packet Access (HSPA), Bluetooth, and Wi-Fi. The mobile device may communicate using separate antennas for each wireless communication standard or shared antennas for multiple wireless communication standards. The mobile device may communicate in a WLAN, a wireless personal area network (WPAN), and/or a WWAN.

FIG. 9 also provides an illustration of a microphone and one or more speakers that may be used for audio input and output from the mobile device. The display screen may be a liquid crystal display (LCD) screen or other type of display screen, such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE that includes a transmission mode component, a selection component, and a transmission component. The transmission mode component is configured to selectively allocate resources for device-to-device communication according to a plurality of transmission modes. The plurality of transmission modes comprising a first transmission mode in which the resources used by the UE are specifically allocated by one of a node B and an eNB and a second transmission mode in which the UE selects the resources from a pool of available resources. The selection component is configured to select one of the plurality of transmission modes as a selected transmission mode based on a signal specifically indicating the selected transmission mode from the base station. The transmission component is configured to transmit signals in frequency resources selected according to the selected transmission mode.

In Example 2, the selection component of Example 1 selects the selected transmission mode based on a RRC message comprising information indicating the selected transmission mode.

In Example 3, the UE of any of Examples 1-2 receives the RRC message in response to sending capability information indicating device-to-device capabilities of the UE.

In Example 4, the selection component of any of Examples 1-3 is further configured to select a default mode comprising one of the plurality of transmission modes in the absence of the signal specifically indicating the selected transmission mode.

In Example 5, the UE of any of Examples 1-4 further includes a device-to-device state component configured to determine when the UE is outside of network coverage.

In Example 6, the device-to-device state component of any of Examples 1-5 determines that the UE is outside of network coverage based on one or more of a measured power level or signal quality of a reference signal from the node B or the eNB being less than or equal to a predefined cell threshold and a number of failed random access attempts without receiving an UL grant is greater than or equal to a predefined attempts threshold.

In Example 7, the UE of any of Examples 1-6 further includes a device-to-device state component configured to determine a current device-to-device state of the UE. The selection component is further configured to autonomously select one of the plurality of transmission modes in response to the current device-to-device state. The current device-to-device state comprises one or more of: a first device-to-device state wherein the UE is within UL coverage and within DL coverage of the node B or the eNB; a second device-to-device state wherein the UE is outside UL coverage and within DL coverage of the node B or the eNB; a third device-to-device state wherein the UE is within partial network coverage, wherein within partial network coverage comprises the UE being outside UL coverage and outside DL coverage but within device-to-device range of another UE that is in the first device-to-device state; and a fourth device-to-device state wherein the UE is outside network coverage and outside partial network coverage.

In Example 8, the selection component of any of Examples 1-7 is configured to select the first transmission mode for the first device-to-device state and select the second transmission mode for the second device-to-device state, third device-to-device state, and fourth device-to-device state. The device-to-device state component is further configured to determine transitions between the device-to-device states based on one or more transition rules.

Example 9 is a wireless communication device configured to determine a direct communication state of the wireless communication device in relation to a base station. The wireless communication device is configured to select a current transmission mode based on the direct communication state. The current transmission mode comprises one of a first transmission mode in which the resources used by the wireless communication device are specifically allocated by the base station and a second transmission mode in which the wireless communication device selects the resources from a pool of available resources. The wireless communication device is configured to transmit direct communications based on the current transmission mode.

In Example 10, the wireless communication device in Example 9 comprises a UE and the base station comprises an eNB. Determining the direct communication state comprises determining whether the UE is in a connected RRC state or is not in the connected RRC state.

In Example 11, selecting the current transmission mode in any of Examples 9-10 comprises selecting the first transmission mode when the UE is in the RRC connected state and selecting the second transmission mode when the UE is not in the RRC connected state.

In Example 12, determining the direct communication state in any of Examples 9-11 comprises determining a current device-to-device (D2D) state comprises one of: a first D2D state wherein the wireless communication device is within UL coverage and within DL coverage of the base station; a second D2D state wherein the wireless communication device is outside UL coverage and within DL coverage of the base station; a third D2D state wherein the wireless communication device is within partial network coverage, wherein within partial network coverage comprises the wireless communication device being outside UL coverage and outside DL coverage but within D2D range of another UE that is in the first D2D state; and a fourth D2D state wherein the wireless communication device is outside network coverage and outside partial network coverage.

In Example 13, selecting the current transmission mode in any of Examples 9-12 comprises selecting the first transmission mode for the first D2D state and selecting the second transmission mode for the second D2D state, third D2D state, and fourth D2D state.

In Example 14, determining the direct communication state in any of Examples 9-13 comprises determining an initial D2D state and further comprises determining one or more subsequent D2D states, wherein the subsequent D2D states are selected based on one or more transition rules.

In Example 15A, the transition rules of Example 14 include one or more of: transitioning from the second D2D state to the first state when RRC connection establishment or reestablishment is successfully completed; transitioning from the third D2D state or fourth D2D state to the first D2D state when a PSS or a SSS is detected, a SIB message containing D2D resource pool configuration is decoded successfully, an RRC connection establishment or reestablishment is successfully completed, and a signal strength of a detected PSS or SSS is above a preconfigured signal strength or the number of consecutively failed random access attempts or SRs without an UL grant is less than a predefined threshold; transitioning from the first D2D state to the second D2D state when the signal strength of a detected PSS or SSS is above a preconfigured signal strength or the number of consecutively failed random access attempts or SRs without an UL grant is less than a predefined threshold; transitioning from the third D2D state or the fourth D2D state to the second D2D state when a PSS/SSS is detected, a SIB message containing D2D resource pool configuration is decoded successfully, RRC connection establishment or reestablishment fails, and either the signal strength of detected PSS or SSS is below or equal to a preconfigured signal strength or the number of consecutively failed random access attempts or SRs without UL grant is not less than a predefined threshold; transitioning from the first D2D state or second D2D state to the third D2D state when RLM indicates a lower layer is out of sync, when the UE failed to recover the radio link sync with an eNB within a predefined time period, and when a PD2DSS channel is detected and a D2D resource pool configuration transmitted on PD2DSCH is successfully decoded; transitioning from the fourth D2D state to the third D2D state when a PD2DSS channel is detected and the D2D resource pool configuration transmitted on PD2DSCH is successfully decoded; transitioning from the first D2D state or the second D2D state to the fourth D2D state when RLM indicates a lower layer is out of sync, when the UE failed to recover the radio link sync with an eNB within a predefined time period, and when no PD2DSS channel is detected; and transitioning from the third D2D state to the fourth D2D state when no PD2DSS channel and no PSS/SSS is detected.

In Example 15B, determining the current D2D state in any of Examples 9-14 comprises determining that the wireless communication device is not in the first D2D in response to one or more of a measured power level or signal quality of a reference signal from the base station being less than or equal to a predefined cell threshold and a number of failed random access attempts without receiving UL grant is greater than or equal to a predefined attempts threshold.

In Example 16, the wireless communication device of any of Examples 9-15 is further configured to scan for a physical PD2DSCH, wherein determining the current D2D state comprises determining based on whether or not the PD2DSCH is detected.

Example 17 is an eNB that includes an SIB component, a D2D control component, and an RRC component. The SIB component is configured to broadcast a SIB indicating a D2D resource pool for resources available for D2D communication or discovery. The D2D control component configured to determine a transmission mode for a UE. The transmission mode comprises one of a first transmission mode in which the resources used by the UE are specifically allocated by the eNB and a second transmission mode in which the UE selects the resources are from a pool of available resources. The RRC component is configured to indicate the transmission mode to the UE using RRC signaling.

In Example 18, the RRC component of Example 17 is further configured to grant the UE access to an UL channel for D2D communication or discovery.

In Example 19, the eNB of any of Examples 16-17 further includes a capability component configured to receive capability information from the UE indicating that the UE is capable of D2D communication using a 3GPP communication standard.

In Example 20, the RRC component in any of Examples 16-18 is configured to indicate the transmission mode in response to receiving the capability information.

Example 21 is a method that includes selectively allocating resources for device-to-device communication according to a plurality of transmission modes. The plurality of transmission modes comprising a first transmission mode in which the resources used by the UE are specifically allocated by one of a node B and an eNB and a second transmission mode in which the UE selects the resources from a pool of available resources. The method includes selecting, at a UE, one of the plurality of transmission modes as a selected transmission mode based on a signal specifically indicating the selected transmission mode from the base station. The method includes transmitting signals in frequency resources selected according to the selected transmission mode.

In Example 22, selecting the selected transmission mode in Example 21 includes selecting based on a RRC message comprising information indicating the selected transmission mode.

In Example 23, the method of any of Examples 21-22 include receiving the RRC message in response to sending capability information indicating device-to-device capabilities of the UE.

In Example 24, selecting in any of Examples 21-23 comprises selecting a default mode comprising one of the plurality of transmission modes in the absence of the signal specifically indicating the selected transmission mode.

In Example 25, the method of any of Examples 21-24 further comprises determining when the UE is outside of network coverage.

In Example 26, the method of any of Examples 21-25 further includes determining that the UE is outside of network coverage based on one or more of a measured power level or signal quality of a reference signal from the node B or the eNB being less than or equal to a predefined cell threshold and a number of failed random access attempts without receiving an UL grant is greater than or equal to a predefined attempts threshold.

In Example 27, the method of any of Examples 21-26 further includes determining a current device-to-device state of the UE, and selecting comprises autonomously selecting one of the plurality of transmission modes in response to the current device-to-device state, wherein the current device-to-device state comprises one or more of: a first device-to-device state wherein the UE is within UL coverage and within DL coverage of the node B or the eNB; a second device-to-device state wherein the UE is outside UL coverage and within DL coverage of the node B or the eNB; a third device-to-device state wherein the UE is within partial network coverage, wherein within partial network coverage comprises the UE being outside UL coverage and outside DL coverage but within device-to-device range of another UE that is in the first device-to-device state; and a fourth device-to-device state wherein the UE is outside network coverage and outside partial network coverage.

In Example 28, autonomously selecting in Example 27 comprises selecting the first transmission mode for the first device-to-device state and select the second transmission mode for the second device-to-device state, third device-to-device state, and fourth device-to-device state, and the method further includes determining transitions between the device-to-device states based on one or more transition rules.

Example 29 is a method that includes determining a direct communication state of the wireless communication device in relation to a base station. The method further includes selecting a current transmission mode based on the direct communication state, wherein the current transmission mode comprises one or more of a first transmission mode in which the resources used by the wireless communication device are specifically allocated by the base station, and a second transmission mode in which the wireless communication device selects the resources from a pool of available resources. The method further includes transmitting direct communications based on the current transmission mode.

In Example 30, the wireless communication of Example 29 comprises a UE and the base station comprises an eNB. Determining the direct communication state comprises determining whether the UE is in a connected RRC state or is not in the connected RRC state.

In Example 31, selecting the current transmission mode in any of Examples 29-30 comprises selecting the first transmission mode when the UE is in the RRC connected state and selecting the second transmission mode when the UE is not in the RRC connected state.

In Example 32, determining the direct communication state in any of Examples 29-31 comprises determining a current D2D state comprises one of: a first D2D state wherein the wireless communication device is within UL coverage and within DL coverage of the base station; a second D2D state wherein the wireless communication device is outside UL coverage and within DL coverage of the base station; a third D2D state wherein the wireless communication device is within partial network coverage, wherein within partial network coverage comprises the wireless communication device being outside UL coverage and outside DL coverage but within D2D range of another UE that is in the first D2D state; and a fourth D2D state wherein the wireless communication device is outside network coverage and outside partial network coverage.

In Example 33, selecting the current transmission mode in Example 32 comprises selecting the first transmission mode for the first D2D state and selecting the second transmission mode for the second D2D state, third D2D state, and fourth D2D state.

In Example 34, determining the direct communication state in any of Examples 32-33 comprises determining an initial D2D state and further comprises determining one or more subsequent D2D states, wherein the subsequent D2D states are selected based on one or more transition rules.

In Example 35, determining the current D2D state in any of Examples 32-34 includes determining that the wireless communication device is not in the first D2D in response to one or more of a measured power level or signal quality of a reference signal from the base station being less than or equal to a predefined cell threshold and a number of failed random access attempts without receiving UL grant is greater than or equal to a predefined attempts threshold.

In Example 36, the method of any of Examples 29-35 further includes scanning for a PD2DSCH, wherein determining the current D2D state comprises determining based on whether or not the PD2DSCH is detected.

Example 37 is a method that includes broadcasting a SIB indicating a D2D resource pool for resources available for D2D communication or discovery. The method includes determining a transmission mode for a UE. The transmission mode comprises one of a first transmission mode in which the resources used by the UE are specifically allocated by the eNB and a second transmission mode in which the UE selects the resources are from a pool of available resources. The method includes indicating the transmission mode to the UE using RRC signaling.

In Example 38, the method of Example 37 further comprises granting the UE access to an UL channel for D2D communication or discovery.

In Example 39, the method of any of Examples 37-38 further comprises receiving capability information from the UE indicating that the UE is capable of D2D communication using a 3GPP communication standard.

In Example 40, indicating in Example 39 comprises indicating the transmission mode in response to receiving the capability information.

Example 41 is an apparatus that includes means to perform a method of any of Examples 21-40.

Example 42 is a machine readable storage including machine-readable instructions, when executed, to implement a method or realize an apparatus of any of Examples 21-41.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

The invention claimed is:

1. An apparatus for use in user equipment (UE), comprising:
    circuitry to access, from a memory device, an indication of a selected resource allocation mode for direct link communication between the UE and one or more other UEs, wherein a first mode for resource allocation comprises scheduled resource allocation by an evolved Node B (eNB) of an evolved universal terrestrial radio access network (E-UTRAN), and wherein a second mode for resource allocation comprises UE autonomous resource selection; and
    processing circuitry to:
        determine whether the UE is in coverage or out of coverage for direct link communication on a cell of the E-UTRAN;
        if the UE is out of coverage for direct link communication, select the second mode as the selected resource allocation mode;
        if the UE is in coverage for direct link communication, decode a radio resource control (RRC) message to determine either the first mode or the second mode configured by the eNB as the selected resource allocation mode; and
    select resources comprising at least one of time and frequency radio resources, based on the selected resource allocation mode, for direct communication between the UE and the one or more other UEs.

2. The apparatus of claim 1, further comprising:
    measurement logic, at least a portion of which comprises circuitry, to detect a network connection condition when the UE is in coverage for direct link communication on the cell, wherein the network connection condition comprises at least one of a physical layer problem or a radio link failure between the UE and the cell of the E-UTRAN, and wherein the processing circuitry is further configured to, in response to the network connection condition, select the second mode as the selected resource allocation mode, even if the eNB configured the first mode for resource allocation.

3. The apparatus of claim 2, wherein the processing circuitry is further configured to:

decode a system information block (SIB) message to identify a resource pool to use when the network connection condition is detected; and in response to detection of the network connection condition, configure lower layers to transmit direct link control information and corresponding data using the pool of resources.

4. The apparatus of claim 1, wherein the processing circuitry is further configured to generate a UE information message to indicate a capability for direct link communication to the eNB, and to decode the RRC message from the eNB in response to the UE information message.

5. The apparatus of claim 1, wherein when the UE is out of coverage for direct link communication, the processing circuitry is further to configure lower layers to transmit direct link control information and corresponding data using a preconfigured pool of resources.

6. The apparatus of claim 1, further comprising measurement logic, at least a portion of which comprises circuitry, to determine a reference signal received power (RSRP) measurement of a signal received from the cell of the E-UTRAN, and wherein the processing circuitry is further to use the RSRP measurement to determine whether the UE is in coverage or out of coverage for direct link communication on the cell of the E-UTRAN.

7. The apparatus of claim 1, wherein the processing circuitry is further to determine whether the UE is in coverage or out of coverage for direct link communication on the cell of the E-UTRAN based on a number of failed random access attempts without receiving an uplink (UL) grant.

8. The apparatus of claim 1, wherein the processing circuitry is further to select one of the first mode or the second mode in response to a current device-to-device state, wherein the current device-to-device state comprises one or more of:

a first device-to-device state wherein the UE is within uplink (UL) coverage and within downlink (DL) coverage of the eNB;

a second device-to-device state wherein the UE is outside UL coverage and within DL coverage of the eNB;

a third device-to-device state wherein the UE is within partial network coverage, wherein within partial network coverage comprises the UE being outside UL coverage and outside DL coverage but within device-to-device range of another UE that is in the first device-to-device state; and a fourth device-to-device state wherein the UE is outside network coverage and outside partial network coverage.

9. The apparatus of claim 8, wherein the processing circuitry is further to:

select the first mode for the first device-to-device state; and select the second mode for the second device-to-device state, third device-to-device state, and fourth device-to-device state.

10. The apparatus of claim 9, wherein the processing circuitry is further to determine transitions between the device-to-device states based on one or more transition rules.

11. A machine readable storage medium including machine-readable instructions, when executed by one or more processors of an evolved node B (eNB), to:

encode a system information block (SIB) message to indicate one or more device-to-device (D2D) resource pool for resources, corresponding to at least one of time and frequency radio resources, available for D2D communication or discovery;

determine a D2D resource allocation mode for a user equipment (UE), wherein the D2D resource allocation mode comprises one of a first mode in which the eNB schedules the resources used by the UE for D2D communication or discovery, and a second mode in which the UE autonomously selects the resources for D2D communication or discovery; and encode a radio resource control (RRC) message configured to indicate the D2D resource allocation mode to the UE.

12. The machine readable storage medium of claim 11, wherein the machine-readable instructions are further to encode the SIB message to indicate first resources by which the UE is allowed to receive D2D communication when in coverage of the eNB and second resources by which the UE is allowed to receive D2D communication when the UE detects a network connection problem.

13. The machine readable storage medium of claim 12, wherein the network connection problem comprises at least one of a physical layer problem or a radio link failure.

14. The machine readable storage medium of claim 11, wherein the machine-readable instructions are further to:

process a D2D UE information message to identify a UE interested in D2D communication; and in response to the D2D UE information message, encode the RRC message for the identified UE.

15. The machine readable storage medium of claim 11, wherein the D2D communication or discovery comprises at least one of direct link communication or discovery between two or more UEs, proximity services (ProSe) communication or discovery, and peer-to-peer communication or discovery.

16. The machine readable storage medium of claim 11, wherein the machine-readable instructions are further to grant a UE access to an uplink (UL) channel for D2D communication or discovery.

17. A machine readable storage medium including machine-readable instructions, when executed by one or more processors of a user equipment (UE), to:

determine that the UE is in coverage for direct communication on a carrier of an evolved universal terrestrial radio access network (E-UTRAN);

in response to the determination that the UE is in coverage, process a message from the E-UTRAN to determine a resource allocation mode selected by an evolved Node B (eNB) of the E-UTRAN, wherein a first mode comprises eNB scheduled resource allocation and a second mode comprises UE autonomous resource selection; and use at least one of time and frequency radio resources, based on the resource allocation mode selected by the eNB, to process a first signal directly to or from one or more other UEs on the carrier.

18. The machine readable storage medium of claim 17, wherein the machine-readable instructions are further to:

detect at least one of a physical layer problem or a radio link failure; and in response, use the second mode to select resources to process a second signal directly to or from the one or more other UEs on the carrier regardless of the resource allocation mode selected by the eNB.

19. The machine readable storage medium of claim 18, wherein the machine-readable instructions are further to:

decode a system information block (SIB) message to identify a resource pool to use when at least one of the physical layer problem or the radio link failure is detected; and in response, configure lower layers to transmit direct link control information and corresponding data using the pool of resources.

20. The machine readable storage medium of claim 17, wherein the message from the E-UTRAN processed to determine the resource allocation mode selected by the eNB comprises a radio resource control (RRC) message, and wherein the machine-readable instructions are further to:

generate a UE information message to indicate a capability for direct communication to the eNB; and decode the RRC message from in response to the UE information message.

21. The machine readable storage medium of claim 17, wherein when the UE is out of coverage on the carrier, the machine-readable instructions are further to configure lower layers to transmit direct link control information and corresponding data using a preconfigured pool of resources.

22. The machine readable storage medium of claim 17, wherein the direct communication comprises at least one of a direct link between the UE and one or more other UEs, a proximity services (ProSe) communication link, a device-to-device (D2D) communication link, or a peer-to-peer (P2P) communication link.

* * * * *